(12) United States Patent
Torres

(10) Patent No.: US 11,568,143 B2
(45) Date of Patent: Jan. 31, 2023

(54) PRE-TRAINED CONTEXTUAL EMBEDDING MODELS FOR NAMED ENTITY RECOGNITION AND CONFIDENCE PREDICTION

(71) Applicant: Intuit Inc., Mountain View, CA (US)

(72) Inventor: Terrence J. Torres, Mountain View, CA (US)

(73) Assignee: Intuit Inc., Mountain View, CA (US)

(*) Notice: Subject to any disclaimer, the term of this patent is extended or adjusted under 35 U.S.C. 154(b) by 383 days.

(21) Appl. No.: 16/685,651

(22) Filed: Nov. 15, 2019

(65) Prior Publication Data

US 2021/0149993 A1    May 20, 2021

(51) Int. Cl.
| | | |
|---|---|---|
| *G06F 40/284* | (2020.01) | |
| *G06F 40/295* | (2020.01) | |
| *G06N 3/04* | (2006.01) | |
| *G06N 3/08* | (2006.01) | |
| *G06V 10/40* | (2022.01) | |
| *G06V 30/10* | (2022.01) | |

(52) U.S. Cl.
CPC .......... *G06F 40/284* (2020.01); *G06F 40/295* (2020.01); *G06N 3/0454* (2013.01); *G06N 3/08* (2013.01); *G06V 10/40* (2022.01); *G06V 30/10* (2022.01)

(58) Field of Classification Search
CPC ........ G06N 3/0454; G06N 3/08; G06V 10/40; G06V 30/10
See application file for complete search history.

(56) References Cited

U.S. PATENT DOCUMENTS

| | | | | |
|---|---|---|---|---|
| 9,037,464 | B1* | 5/2015 | Mikolov | G10L 15/06 704/255 |
| 10,635,751 | B1* | 4/2020 | Relangi | G06N 3/0454 |
| 2005/0049852 | A1* | 3/2005 | Chao | G06F 40/30 704/9 |
| 2018/0285326 | A1* | 10/2018 | Goyal | G06F 16/288 |
| 2018/0322370 | A1 | 11/2018 | Sun | |

(Continued)

FOREIGN PATENT DOCUMENTS

CN    108959252    12/2018

OTHER PUBLICATIONS

Sienčnik, Scharolta Katharina "Adapting word2vec to Named Entity Recognition". Proceedings of the 20th Nordic Conference of Computational Linguistics, 2015 (Year: 2015).*

(Continued)

*Primary Examiner* — Jesse S Pullias
(74) *Attorney, Agent, or Firm* — DLA Piper LLP (US)

(57) ABSTRACT

At least one processor may obtain a document comprising text tokens. The at least one processor may determine, based on a pre-trained language model, word embeddings corresponding to the text tokens. The at least one processor may determine, based on the word embeddings, named entities corresponding to the text tokens; and one or more accuracy predictions corresponding to the named entities. The at least one processor may compare the one or more accuracy predictions with at least one threshold. The at least one processor may associate, based on the comparing, the named entities with one or more confidence levels. The at last one processor may deliver the named entities and the one or more confidence levels.

34 Claims, 12 Drawing Sheets

(56) References Cited

U.S. PATENT DOCUMENTS

2019/0354720 A1* 11/2019 Tucker .................... G06N 5/02
2021/0034701 A1* 2/2021 Fei .......................... G06N 3/02

OTHER PUBLICATIONS

International Search Report dated Oct. 6, 2020 issued in PCT/US2020/040399.
Written Opinion dated Oct. 6, 2020 issued in PCT/US2020/040399.
Howard et al., "Universal Language Model Fine-Tuning for Text Classification", arXiv:1801.06146v5, May 23, 2018.
Devlin et al., "BERT: Pre-training of Deep Bidrectional Transformers for Language Understanding", arXiv:1810.04805v2, May 24, 2019.
Alammar, The Illustrated BERT, ELMo, and co. (How NLP Cracked Transfer Learning), http://jalammar.github.io/illustrated-bert/, Dec. 3, 2018.
Peters et al., "Deep Contextualized Word Representations", arXiv:1802.05365v2, Mar. 22, 2018.
Radford et al. "Better Language Models and Their Implications", https://openai.com/blog/better-language-models/, Feb. 14, 2019.
Schuster et al., "Japanese and Korean Voice Search", 37th International Conference on Acoustics, Speech, and Signal Processing, (ICASSP), 2012.

* cited by examiner

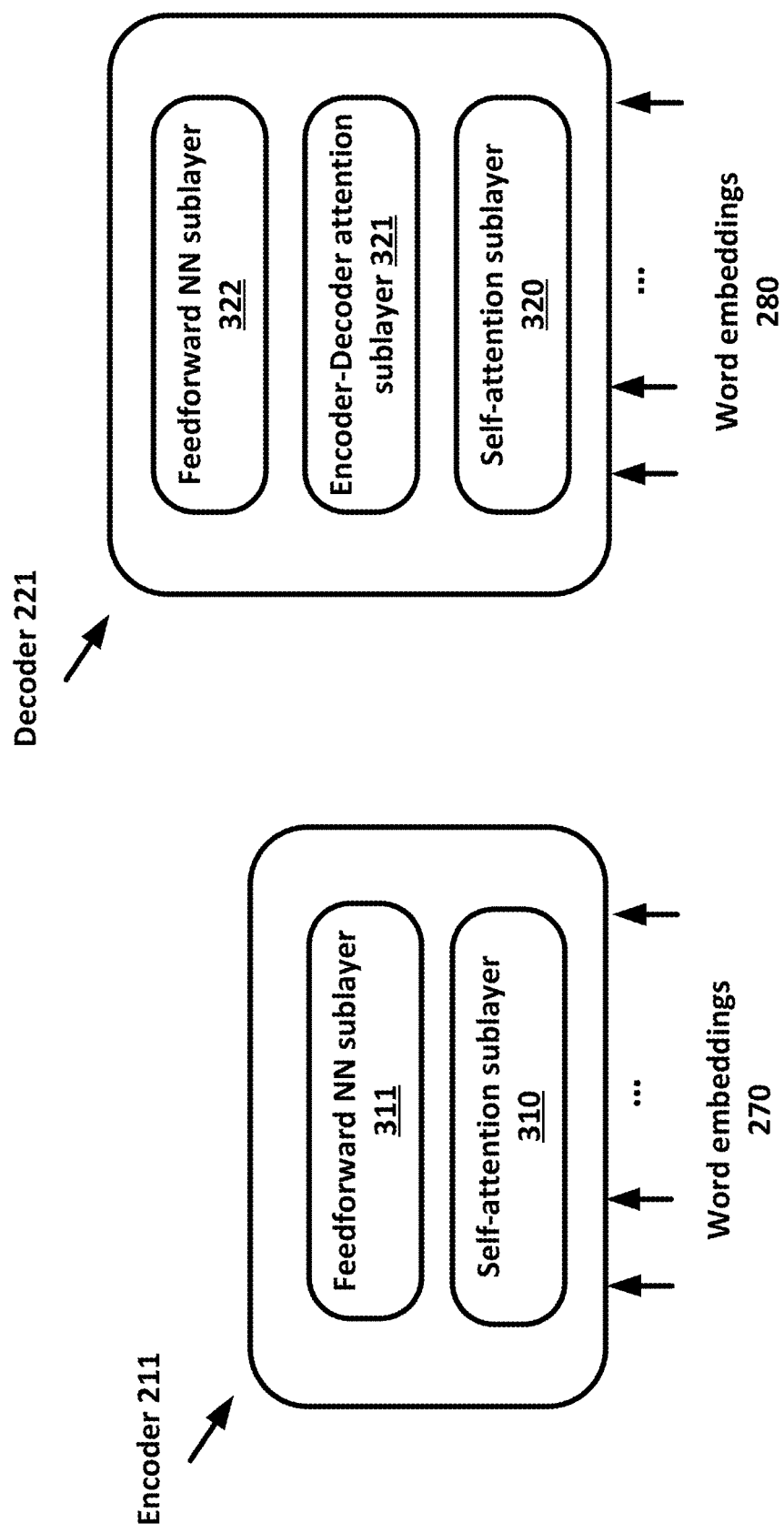

US 11,568,143 B2

PRE-TRAINED CONTEXTUAL EMBEDDING MODELS FOR NAMED ENTITY RECOGNITION AND CONFIDENCE PREDICTION

BACKGROUND

Natural language processing (NLP) is an interdisciplinary field with components from computational linguistics, computer science, machine learning and artificial intelligence. NLP is concerned with analyzing, deciphering, understanding and making sense of human's natural language. The following disclosure provides technical solutions to some of the deficiencies in conventional systems in the NLP field.

SUMMARY

Disclosed herein are system and methods for fine-tuning a pre-trained Universal Language model (encoder) based on transformer architecture. The following example embodiments may use machine learning models for the Named Entity Recognition (NER) problem. As will be described in more detail later, the machine learning models are based on sample data (also referred to as training data) to make predictions or decisions.

BRIEF DESCRIPTION OF THE FIGURES

FIG. 2D shows example sublayers of an encoder in accordance with several aspects of example embodiments in this disclosure.

FIG. 2E shows example sublayers of a decoder in accordance with several aspects of example embodiments in this disclosure.

DETAILED DESCRIPTION OF SEVERAL EMBODIMENTS

Natural language processing (NLP) is an interdisciplinary field with components from computational linguistics, computer science, machine learning and artificial intelligence. NLP is concerned with analyzing, deciphering, understanding and making sense of human's natural language. A variety of tasks (e.g., syntax-related, semantics-related, speech-related, etc.) may be associated with the NLP. Named entity recognition (NER) is known as one of the tasks defined for the NLP. NER is an example of a semantics-related task and aims at locating and classifying named entity mentions in a text and into pre-defined categories such as individual or organization names, locations, time, quantities, financial codes, stock symbols, money values, percentages, etc. Named entities (NEs) may be generic NEs (e.g., a person or location) or domain-specific NEs (e.g., proteins, enzymes and genes for example used in the domain of biology). The NER task may itself be a pre-processing step for a variety of downstream NLP applications such as information retrieval, question answering, machine translation, etc. For example, following text as an input to an NER task Alex purchased 200 shares of AMZN in August 2019 may generate the corresponding output as shown below:

[Alex]$_{person}$ purchased [200]$_{quantity}$ shares of AMZN$_{[stock]}$ in [August 2019]$_{time}$.

Each input word may be referred to as a token. A tokenization process may be used to tokenize the input text and may precede other NER processing. In the example above, each of the words: Alex, purchased, 200, shares, of, AMZN, in, August and 2019 is a token. The output of the NER task consists of single-token NEs such as [Alex]$_{person}$, [200]$_{quantity}$, AMZN$_{[stock]}$, or multi-token NEs such as [August 2019]$_{time}$. An NER task may be coarse-grained wherein the focus is on a small set of NEs (for example, small number of categories for classification) or fine-grained wherein the focus is on a large set of NEs (for example, comparatively larger number of categories for classification).

In this disclosure, the example embodiments may use machine learning models for the NER problem described above. As will be described in more detail later, the machine learning models are based on sample data (also referred to as training data) to make predictions or decisions. While the embodiments are described for NER in the context of financial documents, the example embodiments may be used in a variety of applications and/or disciplines such as but not limited to data analytics, big data, search engines, customer support, machine translation, etc. By reading this specification, it will be apparent to a person of ordinary skill in the art that the disclosed embodiment can be used in other contexts or implemented by using alternative embodiments without departing from the scope.

Figure 1:
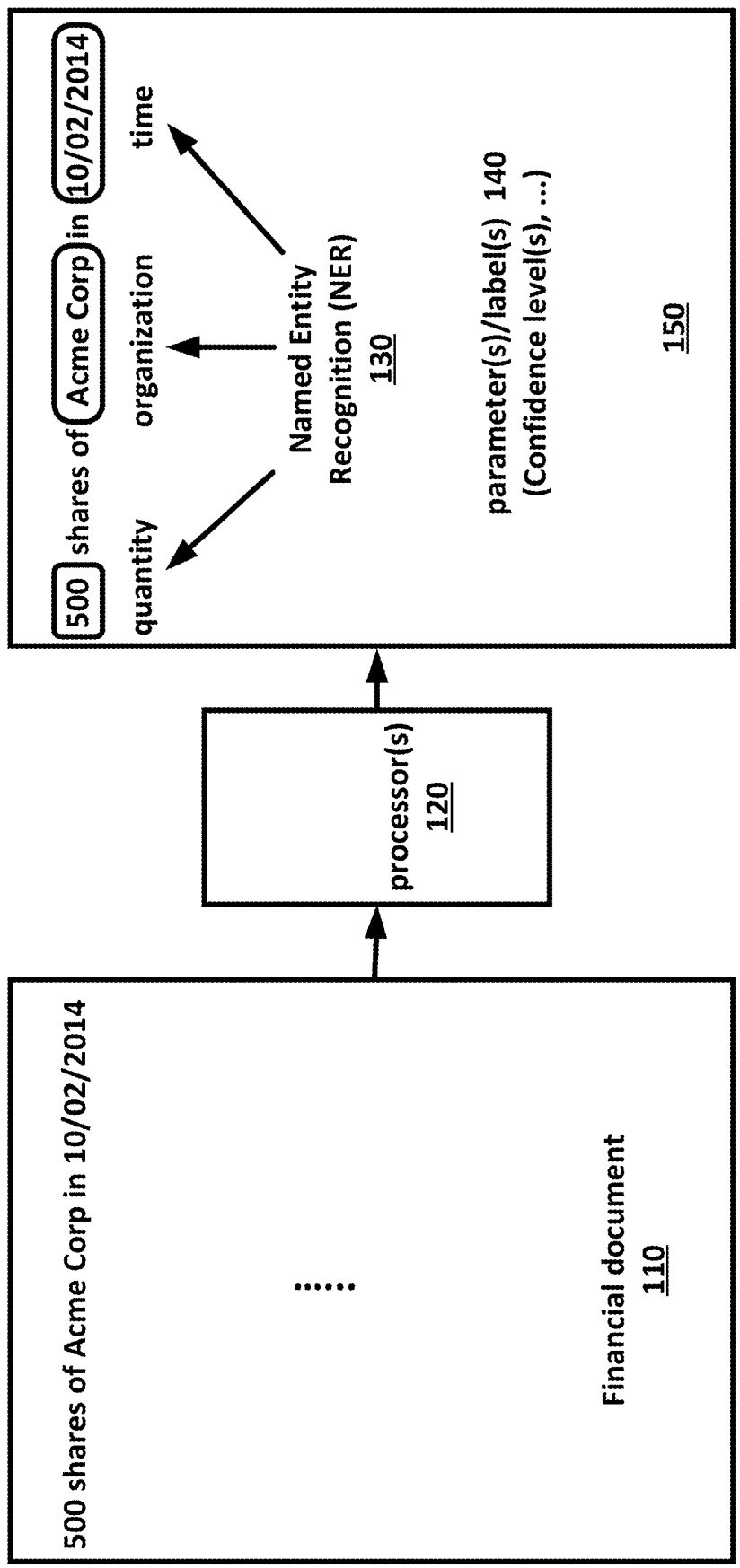
FIG. 1 illustrates an example Named Entity Recognition (NER) process for a financial document in accordance with some aspects of the embodiments of the present disclosure.

FIG. 1 illustrates an example NER process for a document in accordance with some aspects of the embodiments of the present disclosure. An input document (e.g., financial document 110 as considered in this example) may be processed by one or more processors 120 based on example embodiments of the present disclosure. The financial document 110 may be any document comprising financial information. Some examples of the financial document 110 include a receipt, a tax document (e.g., W2), a bank statement, a balance sheet, a cash flow statement, a profit and loss statement, etc. The financial document 110 may comprise text that may indicate financial values and information, names of entities, date, address, codes and symbols, etc. In some examples, the financial document 110 may be a structured document. A structured document may comprise a plurality of pre-defined fields. Examples of structured documents may include standardized forms. The input text tokens may be derived from the financial document based on the pre-defined fields. In some examples, the financial document may be an unstructured document. In an unstructured document, the information may appear in nondeterministic places within the document.

The one or more processors 120 implement some aspects of the example embodiments and may include general-purpose computers, special-purpose computers, a cloud-based computing platform, etc. The one or more processors may receive the financial document (or a document in general) in an electronic format (e.g., with an image format, as a PDF or doc/txt file). In some examples, a hard copy of the financial document may be scanned resulting in the electronic format. In some example, an Optical Character Recognition (OCR) process may be implemented that converts the document (electronic/scanned copy or a hard copy format) to machine encoded text. In some examples, specialized software may be used to convert scanned images of text to electronic text that may enable searching, indexing and/or retrieval of digitized data. In some example embodiments, OCR engines may be developed and optimized for extracting data from business/financial documents, tax documents, checks, invoices, bank statements, insurance documents, and/or alike. The OCR engines may be trained and optimized by processing data sets of scanned documents and/or images. In some examples, the OCR engine may be implemented by the one or more processors 120.

The financial information 110 may be tokenized using a tokenization process (not shown in FIG. 1 and described later) before applying the example embodiments. In an example, the tokenization process may be implemented by the one or more processes 120. The tokenization process may convert the financial data into text tokens. The text tokens may be useful semantic units for further processing. The tokenization is performed by locating word boundaries (e.g., ending point of a word and beginning point of the next word) in a piece of text. A text token is typically an individual word or term within a sentence or phrase. In some examples, the tokenization process may discard certain characters (e.g., punctuation, etc.).

A text token may be converted to a vector of real numbers through a process referred to as word embedding process (not shown in FIG. 1 and described later) which is amenable for processing by the one or more processors 120. The word embedding process may be implemented by the one or more processors 120. The word embedding process may map a phrase (e.g., an input text token) from a vocabulary to a corresponding vector of real numbers. By using the word embedding process, the dimension of the vector space, on which the machine learning processes of the example embodiments may be implemented, may be reduced. The word embedding may enable representing sematic and/or syntactic relationships between words using numerical representation.

As described earlier, in some examples, the financial document 110 may be input to a client device that is not co-located with the one or more processors. For example, when the one or more processors are implemented using a the cloud-based computing platform, the one or more processors 120 may be implemented in a server located in cloud that is owned by an organization which is interested in the analysis of the document or the cloud platform may be provided by a third party. A client application and/or program may be installed in a client device (e.g., a workstation, a wireless device, etc.). The application/program may be configured to send the document to the server that hosts the one or more processor 120 in cloud using one or more communication protocols. For example, the client device may be a wireless device and the communication network may be at least partly a wireless network (e.g., cellular network, wireless LAN, etc.). The client program may be an app installed on the wireless device. In other examples, the client device may communicate with the server that hosts the one or more processors 120 based on a wired communications network (e.g., Ethernet, etc.). The client device may have the scanning and/or OCR capability and may be configured to send the document to the server as machine encoded texts. In some example, the client may be configured to send the document in electronic format and the OCR processing may be performed by the one or more processors 120 at the server. In some example and depending on the importance of the document, a secure communications link may be established between the client device and the server in the cloud.

The financial document 110 may be processed by the one or more processors 120 according to one or more example embodiments of the present disclosure. The one or more processors 120 may perform one or more NLP tasks including an NER task 130 resulting in a document with classified text tokens 150. For example, the financial document 110 may contain the text: "500 shares of Acme Corp in Oct. 2, 2014" and the NER task 130 performed by the one or more processors 120 may result in the following classification: "[500]$_{quantity}$ shares of [Acme Corp]$_{organization}$ in [Oct. 2, 2014]$_{time}$". The one or more processors 120 may associate one or more labels and/or parameters 140 with the text classification performed by the NER task 130. The one or more labels and/or parameters may include at least a confidence level associated with the text classification of the NER task 130. The confidence level may be per text token or for the document as a whole. The document with the classified text tokens 150 may be input to other processing layers for other downstream tasks (for example downstream NLP tasks or other tasks).

The machine learning models in the example embodiments employ multiple layers of processing based on deep learning models. The deep learning models may be based on neural network (NN) models. The NNs learn to perform tasks without being programmed with task specific rules. The model parameters may be optimized through a training process. Different training processes may be used for a NN including supervised training and unsupervised training. In a supervised training process, both the input and the output of the model may be provided and the NN may process the input data based on the model parameters and may compare the output results with the desired outputs. Errors may be propagated back to adjust the weights which control the NN. The data set that is used for training may be processed multiple times to refine the weights associated with the model. With the unsupervised training, the NN may be provided with the input (also referred to as unlabeled data) and not with the desired outputs. The NN may adjust its parameters through self-organization and adaptation processes. Another example of training mechanisms may be semi-supervised training which comprises an unsupervised pre-training step followed by one or more supervised training steps. Example embodiments in this disclosure may employ models that are based on semi-supervised training or supervised training as will be described in more detail.

The NNs may further be categorized into feedforward neural network and recurrent neural networks (RNNs). The feedforward NN may comprise an input layer, one or more hidden layers and an output layer. The number of the hidden layers determine the depth of the NN. With feedforward NN, the information may move in one direction from the input layer through the hidden layer(s) and to the output layer. In RNNs, the information may move in both directions (e.g., in the direction of input layer to the output layer or vice versa). Example embodiments in this disclosure may use a feedforward neural network as a processing layer.

Example embodiments in this disclosure may use a transformer learning model that was introduced in the paper "Attention is All You Need" by Vaswani et. al. and was published in 31st Conference on Neural Information Processing Systems (NIPS 2017), the contents of which is incorporated by reference herein. A brief description of the transformer model as it pertains to the example embodiments is described as follows with reference to FIG. 2A-FIG. 2E.

Figure 2A:
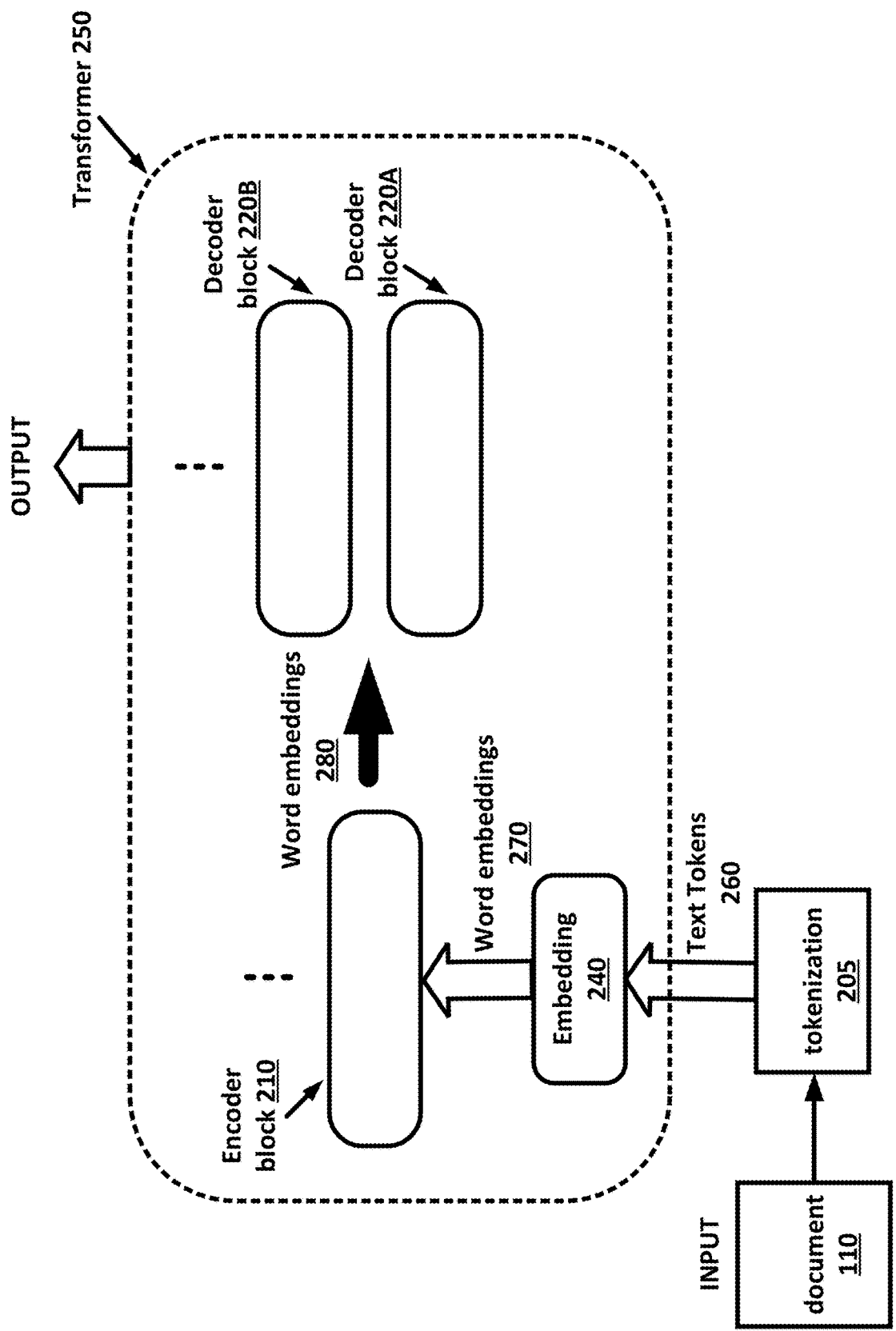
FIG. 2A shows an example transformer model in accordance with several aspects of example embodiments in this disclosure.

FIG. 2A shows an example transformer model in accordance with several aspects of example embodiments in this disclosure. A transformer 250 in this model comprises one or more encoder blocks (e.g., encoder block 210 in FIG. 2A) coupled with one or more decoder blocks (e.g., decoder block 220A or decoder block 220B in FIG. 2A). An output of an encoder block may be an input to one or more decoder blocks. A decoder block (e.g., 220A or 220B) may represent a downstream tasks (for example one or more NLP tasks, machine translation, etc.). In this disclosure and as will be described in more detail later, the transformer model used in some of the example embodiments may employ multiple decoder blocks for performing a plurality of tasks. The plurality of tasks performed by the multiple decoder blocks may be inter-related and the outcome of one task may influence the parameters of a decoder associated with another task. As will be described in more details, the outcomes of the decoders may also be used in fine tuning the parameters of the encoder model. This structure of multiple decoder blocks employed by the example embodiments may enable a multi-task learning structure.

The input to the transformer model is a plurality of text tokens 260 derived, for example, from the financial document 110 and based on a tokenization process 205. The tokenization process 205 uses a tokenization technique to segment input text, from the financial document 110, into individual words and/or sub-words, also referred to as text tokens. The tokenization process may utilize various tokenization techniques including WordPiece, byte-pair encoding (BPE), SentencePiece, etc. Some of the example embodiments in this disclosure use the WordPiece tokenization techniques for the tokenization process 205. The WordPiece technique was introduced in a paper "Japanese and Korean Voice Search" by M. Schuster et. al. and published in 37th International Conference on Acoustics, Speech, and Signal Processing (ICASSP 2012), the contents of which is incorporated by reference herein.

Figure 2B:
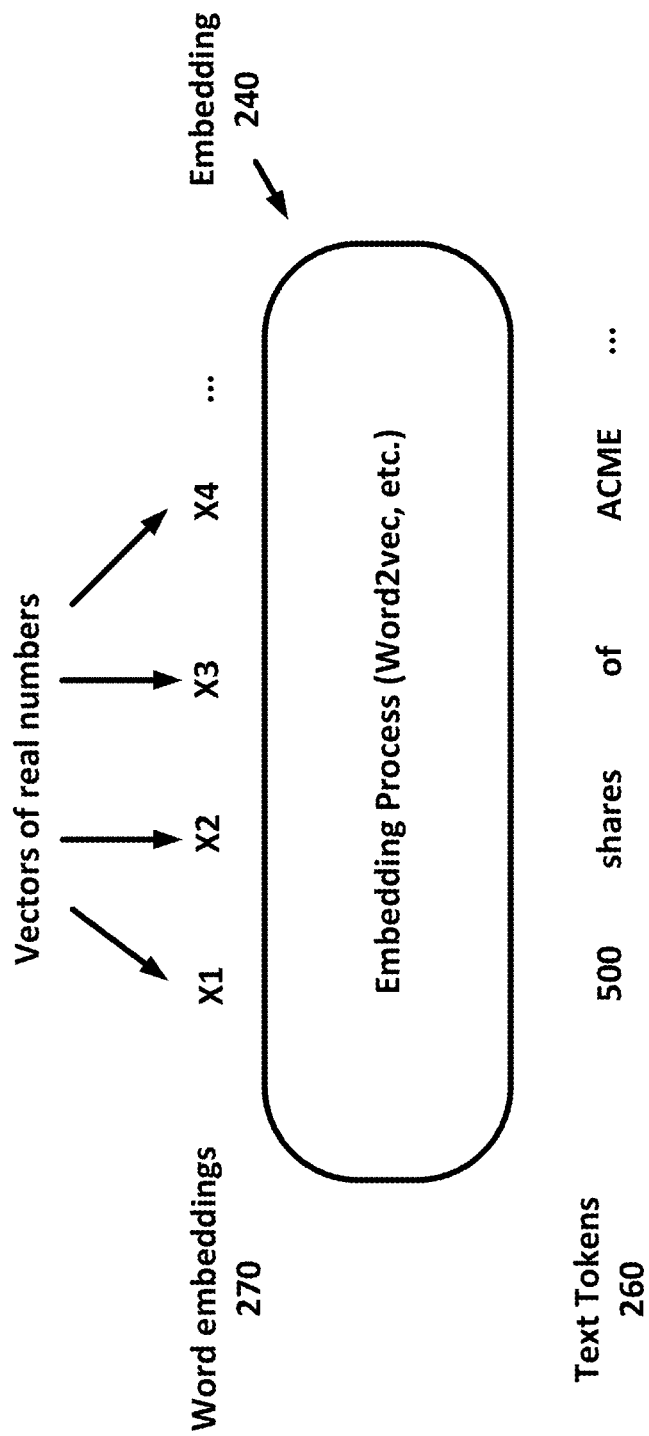
FIG. 2B shows an example embedding process in accordance with several aspects of example embodiments in this disclosure.

The text tokens 260 are first input to an embedding process 240 that converts the text tokens into word embeddings 270. The word embeddings 270 may be vectors of real numbers. An example of an embedding process is shown in FIG. 2B, wherein the text tokens in the phrase "500 shares of ACME . . . " are converted into corresponding vectors (X1, X2, X3, X4, . . . ). The word embeddings 270 are then utilized by the encoder as input. The size of the vectors (size of X1, X2, . . . ) may be constant. For example, the size of the vectors may be set to be 512 that indicates a vector space with dimension 512 for each word embedding. In some example, the size of the vectors that are input or output from different encoders and/or decoders may be fixed. In some examples, the size of a word embedding vector may be a configurable parameter.

The machine learning processes of the example embodiments operate on vectors of continuous real values instead of strings of plain texts. In addition to being more amenable to the machine learning processes disclosed by the example embodiments, the real-valued vectors enable operation on a vector space with reduced dimension. In other words, the space spanned by the vectors representing the word embeddings have a much lower dimensionality compared to the space spanned by the actual text tokens and hence it is much easier to perform the machine learning processes on the vectors. It is also easier to show the contextual similarity of the text tokens with their vector representation. Two word embeddings may have more contextual similarity if their vector representations have a smaller distance in the vector space than two other word embeddings that have a larger distance in the vector space. The embedding 240 therefore enables building a low-dimension vector representation from corpus of text and also preserves contextual similarity of words. Some example embedding methods that may be used in the example embodiments include Word2Vec, etc.

Figure 2C:
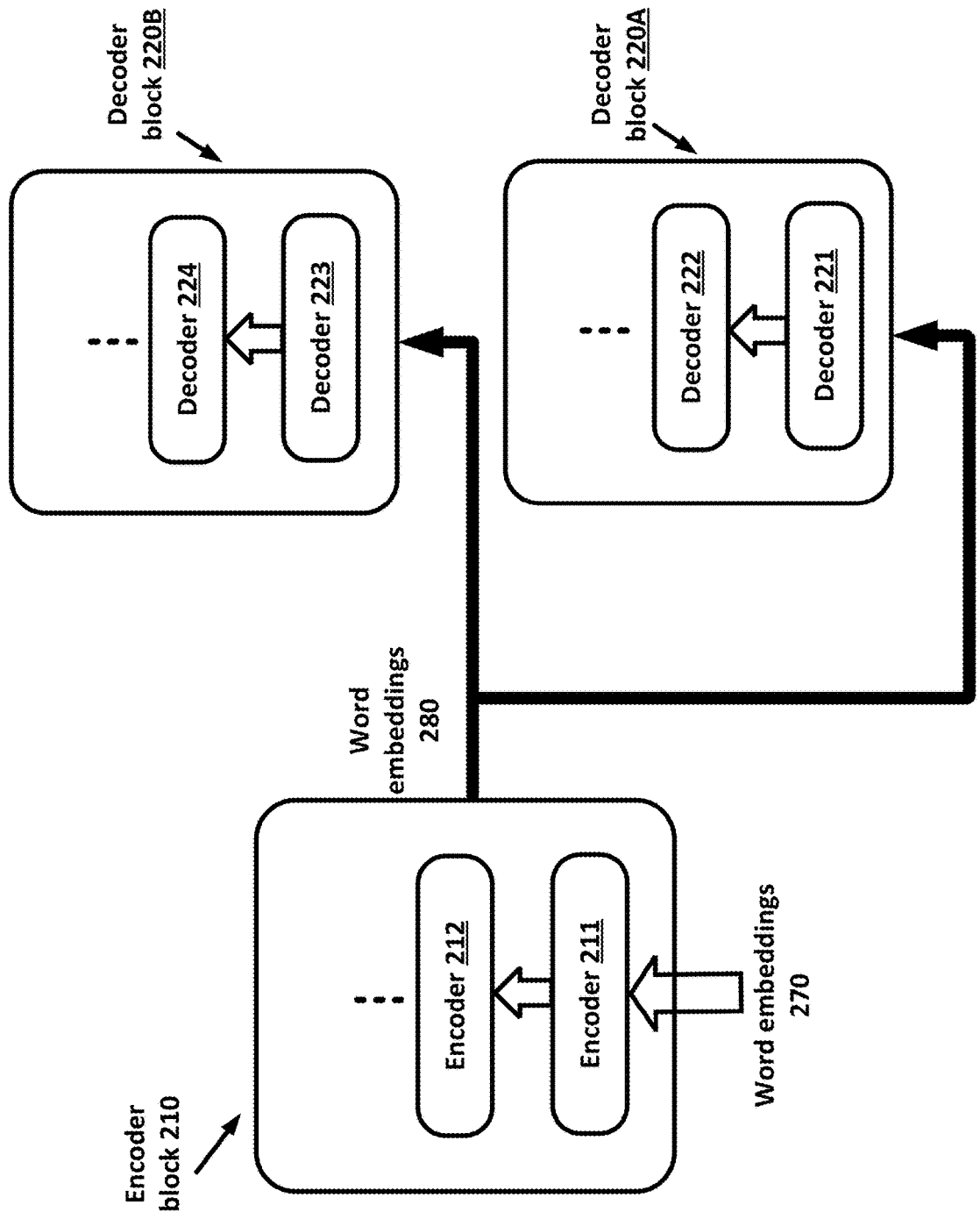
FIG. 2C shows example encoder and decoder structures in accordance with several aspects of example embodiments in this disclosure.

FIG. 2C shows example encoder and decoder structures in accordance with several aspects of example embodiments in this disclosure. The encoder block 210 may comprise a stack of encoders and a decoder block (e.g., the decoder block 220A or 220B) may comprise a stack of decoders. An output of a first encoder layer (for example encoder 211 in FIG. 2C) in the encoders block 210 may be an input of a second encoder layer (for example encoder 212 in FIG. 2C). Similarly, an output of a first decoder layer (for example, decoder 221 in FIG. 2C) may be an input of a second decoder layer (for example, decoder 222 in FIG. 2C). In some examples, the number of encoders in an encoder block may be the same as the number of decoders in a decoders block. In some example, the number of encoders in an encoder block may be different from the number decoders in a decoder block. In some examples, the transformer may comprise a plurality of encoders blocks and/or a plurality of decoders blocks. The word embeddings 280 which are output from the encoder block 210 are input to the decoder blocks 220A and 220B for the downstream tasks.

In an encoder block with multiple layers of encoders and as shown in FIG. 2C, the word embedding may be performed before being input at the bottom most encoder (e.g., encoder 211 in FIG. 2C). The abstraction common across all the encoder layers (as shown in FIG. 2C) may be that they receive a list of vectors, wherein each vector in the list of vectors may have the same fixed size (e.g., 512). In the bottom most encoder, the input may be the word embeddings 270 which are the output of the embedding 240 process. In other encoders, the input may be the output of the encoder that is directly below. The size of the list of the vectors (e.g., the number of vectors that are input to an encoder or decoder) may be a configurable parameter. For example, the size of the list may be the length of the longest sentence in a training dataset. The output of the encoder block 210 in FIG. 2C may be word embeddings 280 and may be, similar to the word embeddings 270, real-valued vectors. The word embeddings 280 may be input to the one or more decoder blocks (decoder block 220A and/or decoder block 220B).

FIG. 2D shows example sublayers of an encoder layer in accordance with several aspects of example embodiments in this disclosure. An encoder layer (e.g., encoder layer 211) of an encoder block (e.g., encoder block 210) may comprise a plurality of sublayers. For example, an encoder layer 211 of the encoder block 210 may comprise a self-attention sublayer 310 and a feedforward NN sublayer 311. The self-attention sublayer 310 enables the encoder 211 to consider other positions of an input sequence when processing a given position of the input sequence. For example, the other positions may be non-contiguous to the position that is being processed. The outputs of the self-attention sublayer 310 may be fed to the feedforward NN sublayer 311. In the example embodiments, the same structure of the feedforward NN sublayer may be used in all encoder layers of an encoder block.

FIG. 2E shows example sublayers of a decoder layer in accordance with several aspects of example embodiments in this disclosure. A decoder layer (e.g. decoder layer 221) in an decoder block (e.g., decoder block 220A) may comprise a plurality of sublayers. For example, a decoder layer 221 of the decoder block 220A may comprise a self-attention sublayer 320, an encoder-decoder attention sublayer 321 and a feedforward NN sublayer 322. The self-attention sublayer 320 enables the decoder 221 to consider other positions of an input sequence when processing a given position. For example, the other positions may be non-contiguous to the position that is being processed. The outputs of the self-attention sublayer 310 may be fed to an encoder-decoder attention sublayer 321. The encoder-decoder attention sublayer 321 may enable the decoder 221 to focus on relevant parts of the input sequence. The output of the encoder-decoder attention sublayer may be then input to the feedforward NN sublayer 322. In some example embodiments, the same feedforward NN sublayer may be used in all decoder layers of a decoder block.

Figure 2F:
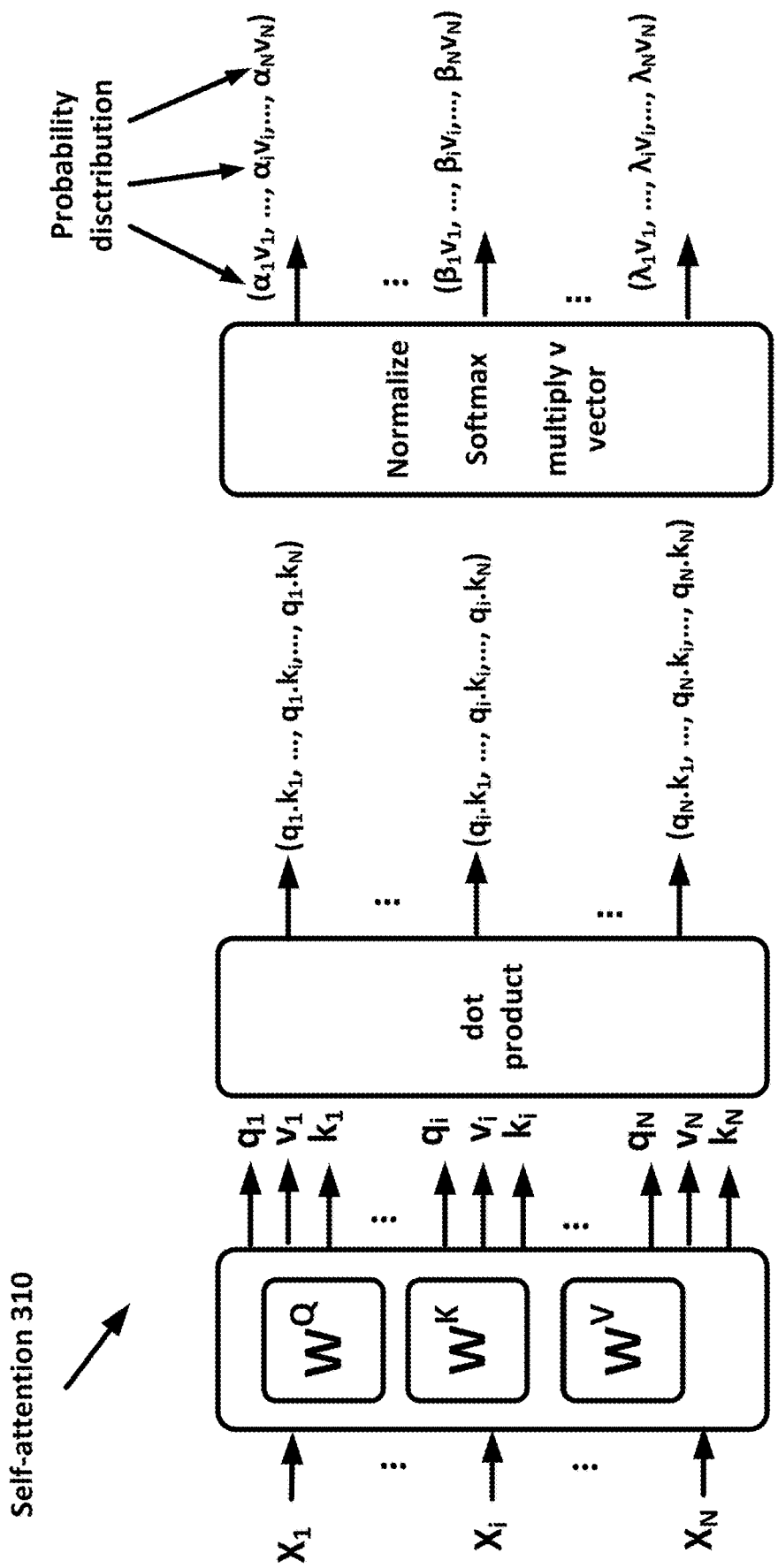
FIG. 2F shows an example self-attention process in accordance with several aspects of example embodiments in this disclosure.

As indicated above, the self-attention sublayer may enable the encoder and/or the decoder to consider inputs at other positions when processing an input at a given position. An example self-attention 310 process for the encoder 211 is shown in FIG. 2F. The self-attention sublayer may operate by using three matrices referred to as a Query matrix, Key matrix and Value matrix (referred to as $W^Q$, $W^K$, and $W^V$, respectively). These matrices may be trained during a training process. Each input vector to the self-attention sublayer (e.g., X) is multiplied by the above three matrices to generate three corresponding vectors referred to as Query vector ($q_i$), Key vector ($k_i$) and Value vector ($v_i$). In some example, the dimension of the $q_i$, $k_i$ and $v_i$ may be smaller than the dimension of $X_i$. When processing an input vector (e.g., $X_i$), dot products of a corresponding quality vector ($q_i$) and key vectors associated with the input vectors ($k_j$, where $1 \leq s \leq N$ indicates index of an input vector,) may be calculated. In this example, the dot products associated with input vector $X_i$ may be $q_i.k_1, \ldots, q_i.k_i, \ldots, q_i.k_N$. The results of the dot products may be referred to as scores. For each input vector position i, a plurality of scores may be obtained for all input positions including a score for position i ($q_i.K_i$).

When processing an input vector at a certain position, the plurality of scores determine how much focus the encoder may put on other positions on a sequence of input vectors. Additional processing may be performed on the scores. The additional processing may include normalization (e.g., dividing the scores by a fixed number that depends on dimension of the input vector) and applying a softmax operator. The softmax operator converts the normalized scores to a probability distribution (e.g., a sequence of positive real numbers that sum up to one). The probability distribution indicates how much focus is applied to other positions when processing the input at a given position. For example, as shown in FIG. 2F, for the input at position i, the probability distribution ($\beta_1, \ldots, \beta_N$) associated with the scores ($q_i.k_1, \ldots, q_i.k_i, \ldots, q_i.k_N$) indicates the attention/focus that the encoder may apply at each position of the N input positions when processing the input at position i ($X_i$). Attention at the position i (the $\beta_i$) may be larger than attention at other positions when processing $X_i$.

By using matrix notation, the output of the self-attention sublayer may be represented using a matrix Z where each row of Z is a scaled version (according to the attention values) of a corresponding v vector. For example, for position i, the ith row of matrix Z is $[q_i.k_1, \ldots, q_i.k_1, \ldots, q_i.k_N]v_i$. In some examples, the self-attention sublayer may employ a multi-headed attention mechanism. The multi-headed attention mechanism may employ several attention sublayers running in parallel each using corresponding Query/Key/Value matrices and may enhance the ability to focus on different positions when processing an input at a given position.

The output of the self-attention sublayer (e.g., matrix Z) is then input to the feedforward NN sublayer (e.g., the feedforward NN 311 of the encoder 211 or the feedforward NN 321 of the decoder 221). The feedforward NN is a type of artificial neural network wherein the information moves in one direction from input layer through one or more hidden layers to an output layer. The input layer receives the information (for example, the matrix Z from the self-attention sublayer as described earlier). The hidden layers perform the computations and transfer information from the input layer to the output layer. Example embodiments may use a position-wise feedforward neural network in an encoder or a decoder, wherein the feedforward neural network may be applied to each position separately and identically.

The output of a top encoder in an encoder block (e.g., word embeddings 280) may be represented by the set of attention vectors K and V that may be used by each decoder in its encoder-decoder attention layer and may enable the decoder to focus on relevant positions in an input sequence. The process may continue at a decoder until a special symbol is reached indicating that the decoder has completed its output. The output may then be fed to the bottom decoder in the next time step. The self-attention sublayer in a decoder (e.g., self-attention sublayer 320 of decoder 221) may be different from the self-attention sublayer in an encoder in that the self-attention sublayer in a decoder may process earlier positions and not the future positions by using a mask for future positions in the sequence.

Manual entry of data from paper documents into a computerized system, transcribing texts and/or image annotation is time consuming and a costly burden for businesses specially small businesses. For example, manual extraction of information from financial documents (receipts, tax documents, bank statements, etc.) may cost a business a significant portion of its revenue. An important aspect of information extraction may be performing NER on a document text that is obtained, for example, after OCR processing of a document image. Existing NER solutions may not have a high level of accuracy and/or may not present a confidence level associated with the NER task for possible downstream processing. Moreover, existing NER solutions mat not operate with small document corpuses, for example, due to security constraints or lack of large ground truth label sets (e.g., data with known input-output relations).

Example embodiments employ machine learning processes for capturing and classifying images, data from structured and unstructured documents such as but not limited to smartphone photos, PDFs, forms and so on. Example embodiments enhance the existing NER processes by increasing the accuracy levels of name entity recognition/ classification and using the confidence level associated with the NER task (e.g., at the token-level or document-level) for additional downstream processing or routing of the document to appropriate functions after the classification task. Example embodiments use a pre-trained encoder model that may allow for fast adaptation to new document domains and may eliminate the need for large document sets with ground truth labels. Example embodiments enhance the accuracy and confidence level of NER, at the token-level and document-level, by training and/or fine tuning of the models using a multi-task learning structure. Example embodiments enhance the information extraction and confidence estimation compared to existing solutions such as Bidirectional LSTM-CRF models, for example as introduced in the paper "LSTM-CRF Models for Sequence Tagging" by Z. Huang et. al, published in ArXiv in 2015, the contents of which is hereby incorporated by reference.

Example embodiments may employ a language representation model referred to as Bidirectional Encoder Representations from Transformers (BERT) which is based on the transformer model described earlier. BERT was introduced in the paper "BERT: Pre-training of Deep Bidirectional Transformers for Language Understanding" by J. Devlin et. al, that was published in 2019 Annual Conference of the North American Chapter of the Association for Computational Linguistics, the contents of which is incorporated by reference herein. BERT may perform a similar function as an encoder block (e.g., encoder block 210 in FIG. 2A or FIG. 2C) in a transformer model that was described earlier. Similar to the encoder block 210, BERT comprises a plurality of encoder layers, the number of which may vary based on the model size. The output of the BERT encodings may be word embeddings that may be input to downstream tasks which may have similar decoder structures of the transformer model as described in FIG. 2A-FIG. 2F.

The BERT model enables contextual embedding of the input text tokens, wherein the embedding of a word may consider the context in which the word appears. For example, without contextual awareness, the word "plane" would be represented by the same embedding in the following sentences: "The plane took off at nine in the morning", "The plane surface is a must in baseball" and "Plane geometry is an interesting area" even though the meaning of "plane" changes based on the context. Contextual word embedding may consider an entire sentence or group of tokens in the sentence before assigning each word with its context. During the pre-training phase, the BERT model may pre-train deep bidirectional representations from unlabeled text by jointly conditioning on both left and right contexts in all layers.

Figure 3:
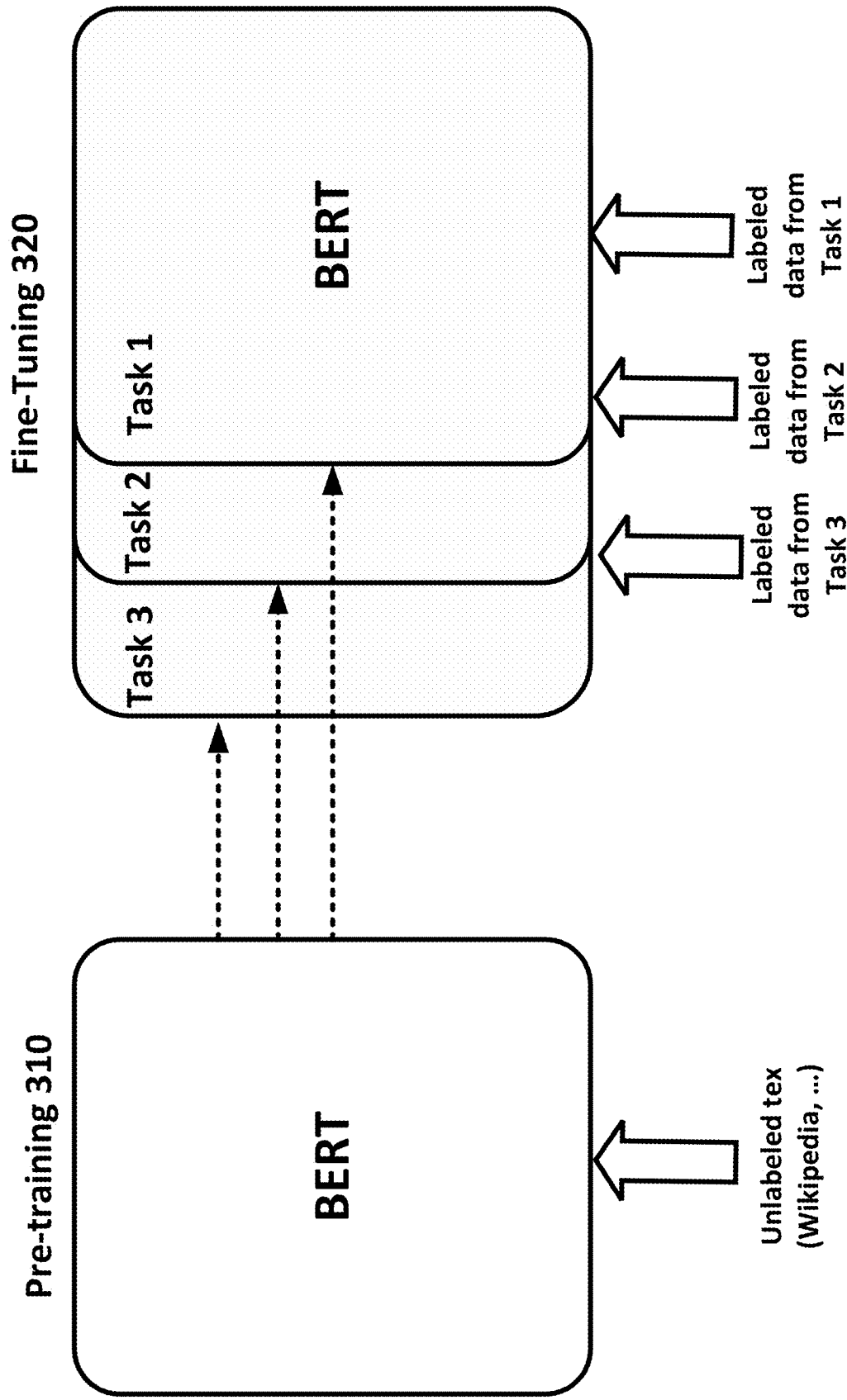
FIG. 3 shows an example training process for Bidirectional Encoder Representation from Transformers (BERT) with multiple downstream tasks in accordance with several aspects of example embodiments in this disclosure.

An example training process for BERT with multiple downstream tasks is shown in FIG. 3. The BERT model comprises two steps of pre-training 310 and fine tuning 320. The model may employ the pre-training 310 by using unlabeled text from massive data sets (e.g., Wikipedia text passages, BooksCorpus, etc.) and by using long contiguous sequences. In an example, the pre-training 310 may be independent of a downstream task. For example, for the NER task based on financial documents, as discussed in some of various example embodiments, the pre-training of BERT may be using corpus that may not necessarily contain financial information. In some examples, the pre-training 310 may be related to the downstream tasks. The pre-trained BERT model may then be used in conjunction with one or more downstream tasks (e.g., a classification task, an NLP task, etc.) that may employ training with a labeled dataset (e.g., supervised training). During the training phase of the downstream task, the parameters of the BERT model may be changed. The parameters of the BERT model may change using a fine-tuning process based on the labeled data from downstream tasks wherein the pre-trained parameters of the BERT model may be fine-tuned. This process may be referred to as semi-supervised training to distinguish it from supervised and unsupervised training methods. Example embodiments may employ a BERT model for a plurality of downstream tasks. When the BERT model is used with a plurality of downstream tasks, the same pre-trained model may initially be used for all tasks. As shown in FIG. 3, the parameters of BERT may then be fine-tuned separately for each downstream task using labeled data from the corresponding downstream task.

Example embodiments may be implemented using one of a plurality of architectures for the BERT models. The plurality of architectures may comprise a BERT BASE model in which the number of encoder layers may be set to a first number (e.g., 12) and a BERT LARGE model in which the number of encoder layers may be set to a second number larger than the first number (e.g., the second number may be set to 24). The feedforward NNs employed by the encoder layers in the BERT model (for example shown as feedforward NN sublayer 311 of encoder 211 in FIG. 2D in the context of transformers) may have a large number of hidden layers (in some examples 768 hidden layers for BERT BASE model and 1024 hidden layers for BERT LARGE model). The attention layer may be multi-headed as described in the transformer model and in some examples, the number of attention heads may be 12 and 16 for the BERT BASE model and the BERT LAREG model, respectively. The BERT transformer may use a bidirectional self-attention model enabling the encoder to incorporate context (e.g., text tokens) from both left and right directions.

The first token among the tokens that are input to the BERT may be a special token referred to as [CLS] (e.g., standing for classification). Similar to the transformer model, BERT may take a sequence of tokens as input which may keep flowing up the stack of the encoder layers. Each layer may apply self-attention, and may pass the results through a feed-forward network, and then may hand the results off to the next encoder. Each position in the output of the encoder outputs a vector of size hidden_size. In some example embodiments, the value of hidden_size may be 768. The hidden_size may be the number of hidden layers of the feedforward neural network employed by an encoder. In some example, the output corresponding to the first position (e.g., position of the [CLS] token) may be input to a downstream task (e.g., classifier) for the corresponding task (e.g., classification, etc.).

Figure 4:
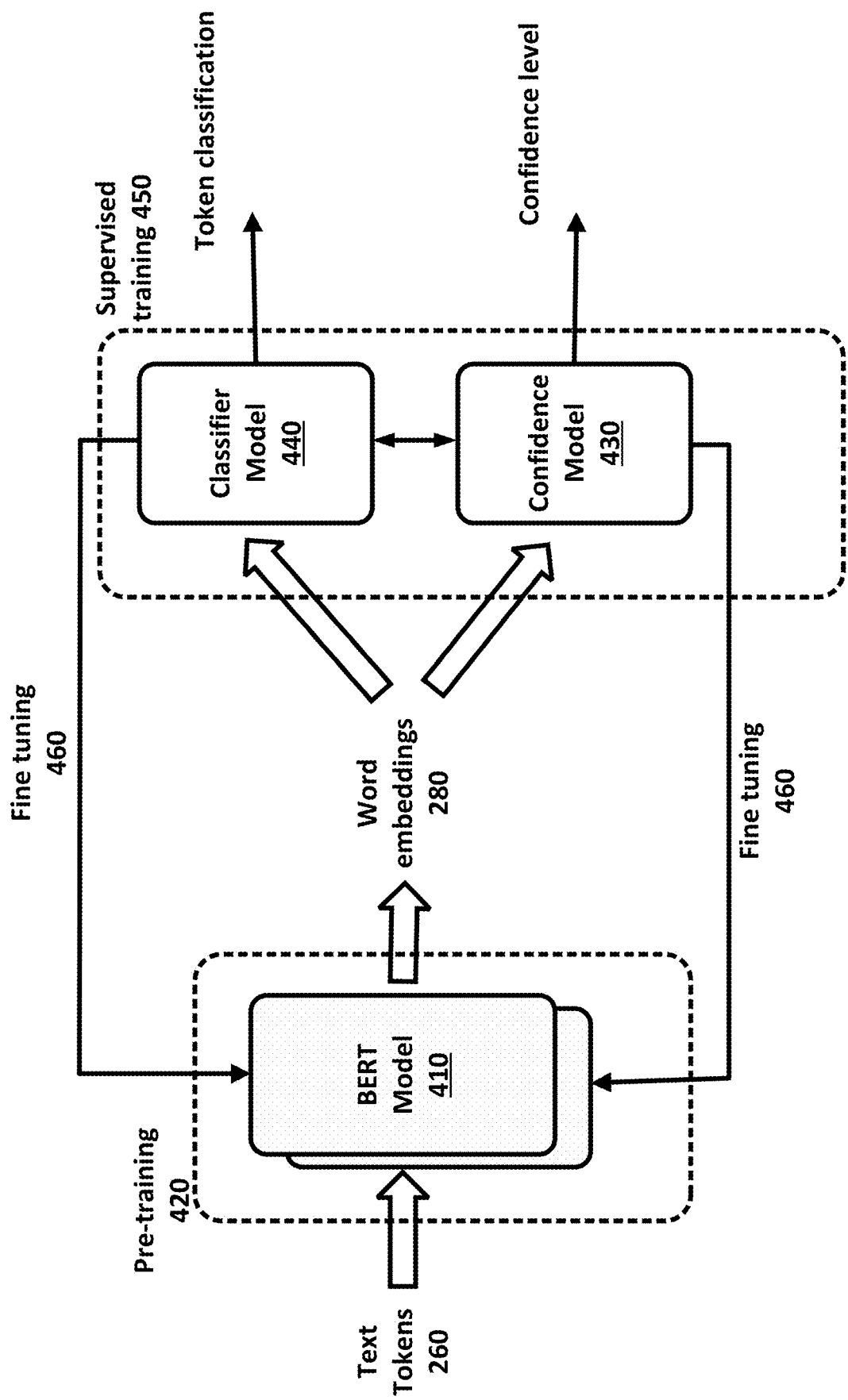
FIG. 4 shows an example BERT encoder in conjunction with two downstream tasks of text classification and confidence modeling in accordance with several aspects of example embodiments in this disclosure.

An example embodiment that employs a BERT encoder in conjunction with two downstream tasks of text classification and confidence modeling is shown in FIG. 4. As discussed earlier in the context of the transformer model, the input to an encoder block (the BERT model in this example) may be text tokens 260. The text tokens may be obtained using a tokenization process, for example based on the WordPiece tokenization technique or other techniques. The tokenization process may be applied to the document (e.g., a financial document in an example embodiment) creating the plurality of text tokens 260.

The BERT model 410 may be a pre-trained model of a stack of encoders that may use the pre-training process 420. The stack of encoders may have a similar structure as the encoder block 210 in the transformer model 250. In some examples, the corpus used for the pre-training 420 may be non-task-specific and without dependence on the downstream tasks. In some examples, the pre-training 420 may use task specific corpus to enhance the performance. The pre-trained BERT model may be used for encoding the text tokens 260 and generating the word embeddings 280. The word embeddings 280 may be used as input to a classifier model 440 and confidence model 430. The classifier model 440 and the confidence model 430 may have a similar structure of decoder blocks described in the context of the transformers, wherein each model comprises one or more decoder layers. A decoder layer may employ a feedforward neural NN sublayer and may additionally have self-attention and/or encoder-decoder attention sublayers. In some examples, the decoders used for the classifier model 440 and the confidence model 430 may be linear decoders employing a linear neural network model. A linear neural network uses a linear transfer function, wherein an output of the network is a linear function of its input.

The classifier model 440 and the confidence model 430 may be trained using a supervised training process 450. The supervised training 450 may employ existing labeled data to train the models. The labeled data may comprise, for example, texts that have been already classified manually or texts whose classification is known beforehand. With the supervised training, the parameters of the model may be optimized so that the model can generate the known outputs (e.g., the known classification of input tokens) given the know inputs (e.g., the known text tokens). The texts used for the supervised training process of 450 may be from a financial dataset, for example, if the example embodiment is for data classification of financial documents. In other example, texts from other domains may also be used. During the supervised training process 450 of the classifier model 440 and the confidence model 430, the pre-trained parameters of the BERT model may also change and may be optimized through the process known as fine tuning 460. This enables task-specific optimization of the BERT model. While the same BERT model with the same pre-trained parameters may be initially used for both of the classifier model 440 and the confidence model 430, the BERT parameters may be separately optimized for different downstream tasks.

The classifier model 440 may be used to apply the NER process to the input text and may attach labels to the input text tokens from a set of possible labels. The confidence model 430, on the other hand, may assign a confidence level and/or a probability of accurate prediction to each recognized name entity from the classification task. In example embodiments, the outputs of the two models (the NER task and the accuracy prediction) may be inter-related. For example, the classifier model may assign, based on existing ground truth label sets, a binary label to each classified token and the confidence model may determine accuracy level for the labels associated with each classified token and established by the classifier model. The parameters of the classifier model 440 and the confidence model 430 may, therefore, be jointly trained and optimized. Example embodiments may employ a joint training and optimization process for the supervised training process 450. During the training process of the classifier and the confidence mode, the parameters of the BERT model may also change through a process referred to as fine tuning 460. The fine tuning process in example embodiments may take a linear combination of losses for each of the two decoder head tasks (e.g., decoder heads associated with the classification model and the confidence model) as the final objective and backpropagate the errors throughout the network.

Figure 5:
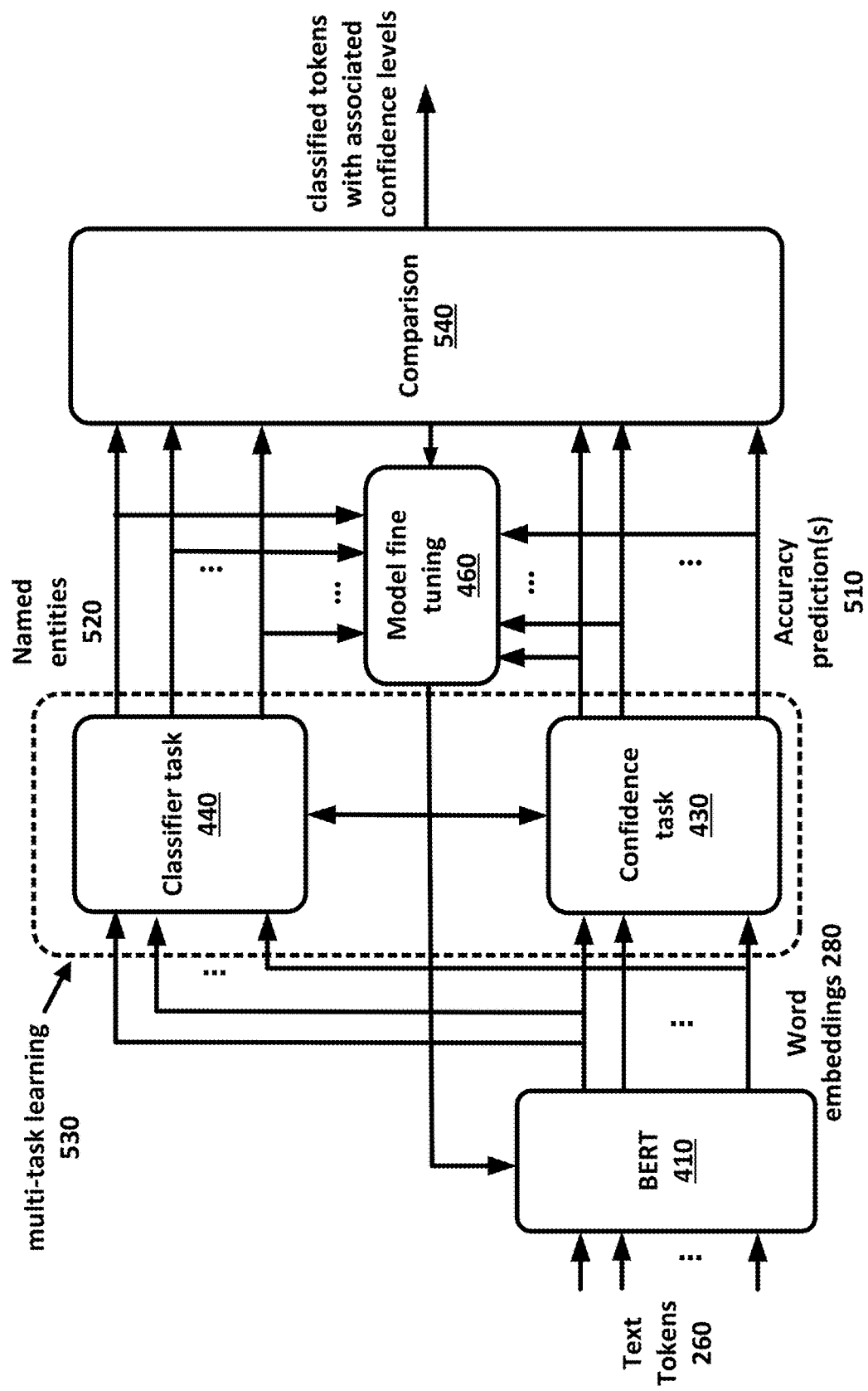
FIG. 5 shows an example embodiment in this disclosure.

An example embodiment is shown in FIG. 5 wherein additional processing on the outputs of the classifier model 440 and the confidence model 430 is shown. As indicated earlier, example embodiments employ a multi-task learning process 530, wherein the outputs of each decoder, associated with a task, are inert-related and are jointly trained and optimized. The parameters of each of the classifier task or the confidence task decoders are trained using the input labeled dataset and the outcomes of both model. The joint training of both decoders may enhance the training process compared to when each training is performed separately and without considering outputs from the other model. The parameters of the BERT model may also change by backpropagating an error parameter based on the outcomes of the decoders. This process may be referred to as model fine tuning 460. The outcome of the classifier task 440 may be named entities 520 which are labels, from a set of named entities, that are associated with the text tokens. The outcome of the confidence task 430 may be accuracy predictions 510 that associates each text token classification with a corresponding probability of correct classification (or incorrect classification). The extracted named entities and corresponding accuracy predictions may be input to a comparison process 540, wherein the accuracy predictions are compared with set thresholds. The thresholds may be configurable values. The comparison process 540 may be on a text token-level or document-level. The output of the comparison process 540 may be the classified text tokens along with the token-level and/or document level confidence values. The classified text tokens and/or the document may then be routed to different downstream tasks based on their associated confidence levels. In some examples, a flag may be associated with the delivered classified document that may be indicative of a confidently accurate classification or a potentially erroneous classification.

Figure 6:
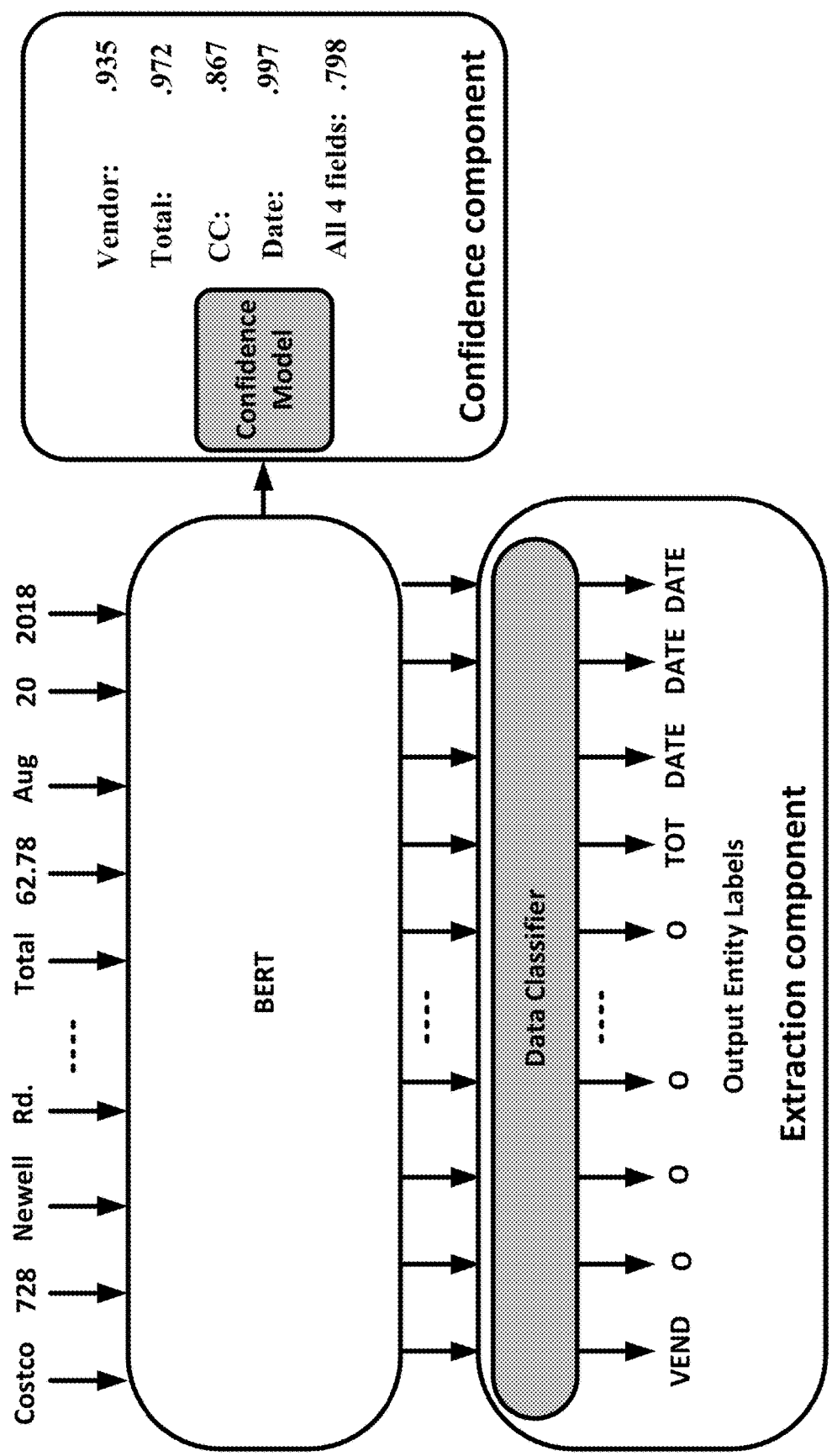
FIG. 6 shows example outputs of a data classifier model and a confidence model for example input text tokens.

FIG. 6 shows example outputs of a data classifier model and a confidence model for example input text tokens. The input text tokens may be, for example, from a receipt issued by a vendor. The text tokens may be input to the BERT model and the output word embeddings may be fed to a data classifier decoder and a confidence modeling decoder. The data classifier may associate each token with one of a plurality of labels/named entities (in this example, Vendor name, Total money value, credit card (CC) number, and Date). The confidence model in this example, indicates what are the probability of correct classification for each of the classified named entities. For example, the probability of correct classification of a token as a "Vendor" named entity may be 0.935, the probability of correct classification of a token as a "Total money value" may be 0.972, the probability of correct classification of the credit card (CC) number may be 0.867 and the probability of correct classification of "Date" may be 0.997. The confidence mode may associate a document-level confidence value of 0.798 for the classification of tokens in the document by considering all classified named entities.

Figure 7:
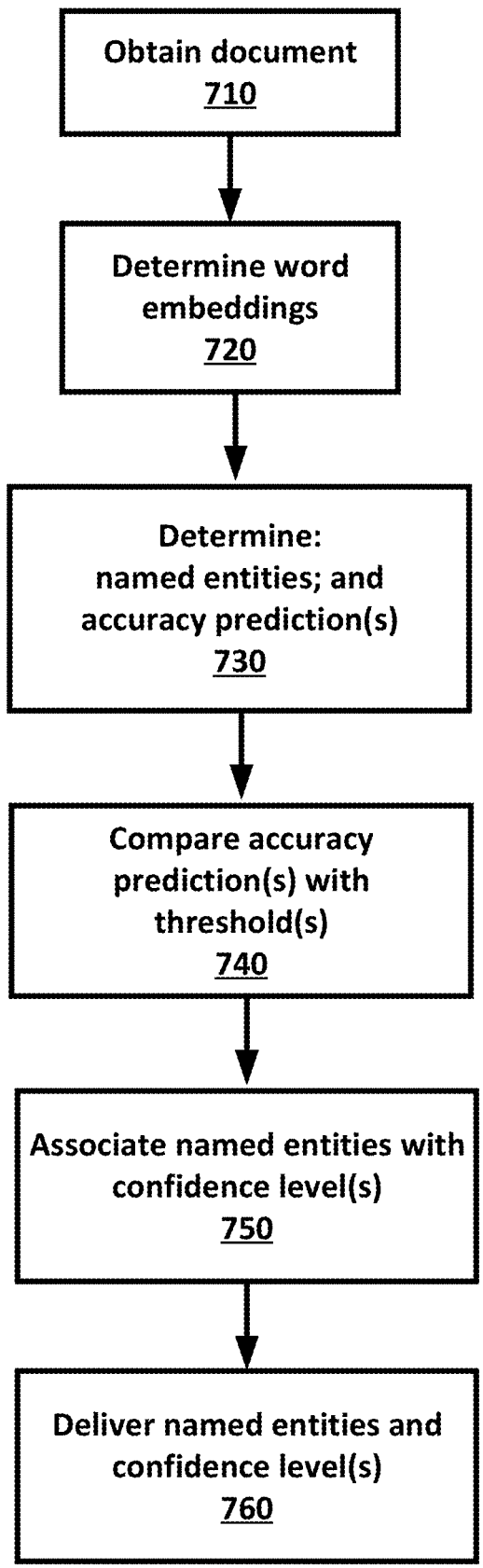
FIG. 7 shows example data classification and confidence modeling processes in accordance with several aspects of example embodiments in this disclosure.

FIG. 7 shows example data classification and confidence modeling processes in accordance with several aspects of example embodiments in this disclosure. At 710, one or more processors may obtain a document comprising a plurality of text tokens. The one or more processors may determine word embeddings corresponding to the text tokens based on a pretrained language model. At 730, based on the word embeddings, the one or more processor may determine named entities corresponding to the tokens and may determine accuracy predictions corresponding to the named entities. At 740, the one or more processors may compare the one or more accuracy predictions with one or more thresholds. At 750, the one or more processors may associate the named entities with one or more confidence levels. At 760, the one or more processors may deliver the named entities and the one or more confidence levels.

According to an embodiment, the document obtained by the one or more processors may be a financial document. For example, the financial document may be a receipt, a tax document (e.g., W2), a bank statement, a balance sheet, a cash flow statement, a profit and loss statement, etc. In other embodiments documents related to different other domains may be used. According to an embodiment, a word embedding may be a vector of real numbers. The word embeddings corresponding to a plurality of input text tokens, may be, in general represented by a matrix, wherein a row of the matrix may represent a vector corresponding to a word embedding.

According to an embodiment, the one or more processors may determine the text tokens from the input document using a tokenization process. The tokenization process may use a tokenization technique. The tokenization technique may be one of a plurality of existing tokenization techniques such as WordPiece, etc.

According to an embodiment, the one or more accuracy prediction comprise at least one of: a token-level accuracy prediction for a first text token of the text tokens; and a document-level accuracy prediction for the document. A document-level accuracy prediction may be based on a plurality of token-level accuracy prediction. For example, the document-level accuracy prediction may be a linear combination of text-token level accuracy prediction. In an example, different weights may be assigned to different named entities to calculate the document-level accuracy prediction.

According to an embodiment, the pre-trained language model may be a bidirectional transformer encoder model (also referred to as BERT model) comprising a plurality of encoder layers. The BERT model may have a similar structure as an encoder block in a transformer model. The BERT model may enable a contextual embedding of the input text tokens.

According to an embodiment, an output of a first encoder layer, in a plurality of encoder layers of BERT, may be input to a second encoder layer in the plurality of encoder layers. The input to the bottom most encoder layer may be the text tokens and the output of the top most encoder layer may be the word embeddings.

According to an embodiment, an encoder may comprise a self-attention sublayer and a feedforward neural network sublayer. According to an embodiment, an encoder layer in BERT may comprise a sequence of input values and the self-attention sublayer may comprise processing a first input value, of the input values, based at least on a second input value of the input values. For example, the self-attention sublayer may enable the encoder to consider other positions of the input sequence when processing a given position of the input sequence.

According to an embodiment, determining the named entities may be based at least on a first decoder; and determining the one or more accuracy predictions is based at least on a second decoder. This structure may be referred to as dual-headed decoder structure. Such structure may enable multi-task leaning, wherein the parameters of the decoders may be jointly trained and optimized.

According to an embodiment, the one or more processors may further fine tune the pre-trained language model based at least on one first outcome of the first decoder and at least one second outcome of the second decoder. Using the fine-tuning process, the BERT model may be first initialized with the pre-trained parameters and the parameters may be fine-tuned using labeled data from downstream tasks.

According to an embodiment, the one or more processors may further fine tune the pre-trained language model based on at least one first outcome of the first decoder and at least one second outcome of the second decoder. According to an embodiment, the one or more processors may further train one or more first parameters of the first decoder based on at least one first outcome of the first decoder and at least one second outcome of the second decoder; and may train one or more second parameters of the second decoder based on the at least one second outcome of the second decoder and the at least one first outcome of the first decoder.

According to an embodiment, a decoder (e.g., corresponding to the classification task or confidence modeling task) may comprise one or more of a self-attention sublayer, an encoder-decoder attention sublayer and a feedforward linear neural network sublayer. In some examples, the feedforward neural network may be a linear neural network wherein the input-output relation may be based on a linear function. The decoder using the linear neural network may be referred to as a linear decoder.

According to an embodiment, the one or more processors may further concatenate contiguous text tokens, that have the same associated named entity, to form a first sequence of text tokens; and may extract information based on the first sequence. According to an embodiment, the one or more processors may obtain the document based on an optical character recognition (OCR) processing of an image of the document. According to an embodiment, a confidence level of the one or more confidence levels may be one of a confidently accurate and erroneous.

According to an embodiment, the document may be a structured document. An structured document may comprise a plurality of pre-defined fields. Examples of structured documents may include standardized forms. The input text tokens may be derived from the financial document based on the pre-defined fields. According to an embodiment, the document may comprise a plurality of pre-defined fields, wherein the text tokens are derived from the plurality of pre-defined fields. According to an embodiment, the document may be an unstructured document. In an unstructured document, the information may appear in nondeterministic places within the document.

Figure 8:
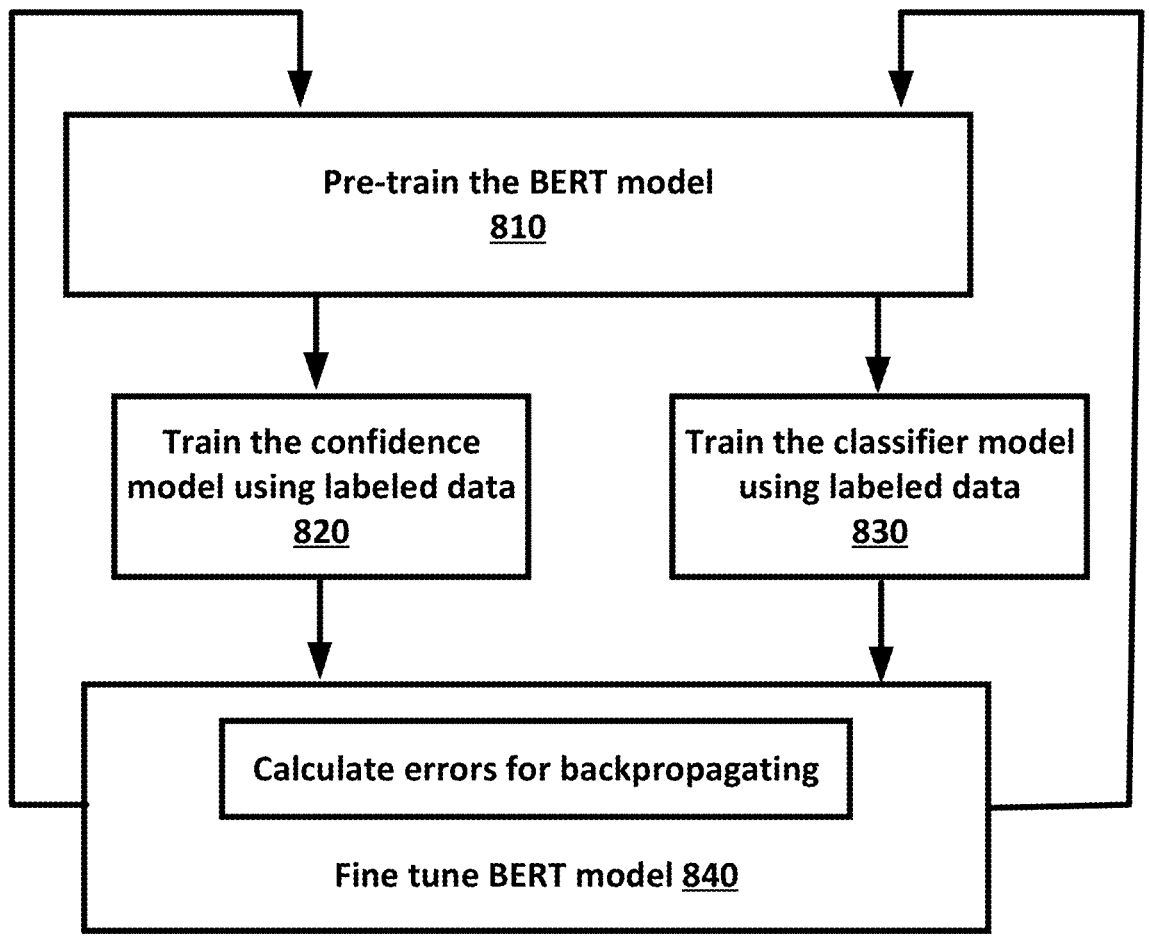
FIG. 8 shows example pre-training, supervised training and fine tuning of various processes in accordance with several aspects of example embodiments in this disclosure.

FIG. 8 shows example pre-training, supervised training and fine tuning of various processes in accordance with several aspects of example embodiments in this disclosure. BERT uses a two-phase framework for training comprising a pre-training phase and fine-tuning phase. At 810, the BERT model may be pre-trained using unlabeled text. The dataset used for pre-training may be unrelated to downstream tasks. The dataset may comprise, for example, Wikipedia text passages, BookCorpus, etc., and may comprise long contiguous sequences. The pre-trained BERT model may then be used for two downstream tasks, e.g., the confidence model and the classifier model. At 820, the confidence model may be trained using supervised training and based on labeled data. At 830, the classifier model may be trained using supervised training and based on labeled data. In the process of training the confidence model and the classifier model, the parameters of the pre-trained BERT model may also be adjusted. This process may be referred to as fine tuning 840. For fine-tuning 840, the BERT model may be first initialized with the pre-trained parameters. The pre-trained parameters may be fine-tuned using labeled data from the downstream tasks. The fine-tuning process 840 may be based on calculating errors that may be linear combination of losses form the two decoders and backpropagating the errors to the BERT model for readjusting the pre-trained parameters.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A method comprising:
  obtaining, by at least one processor, a document comprising text tokens;
  determining, by the at least one processor and based on a pre-trained language model, word embeddings corresponding to the text tokens;
  determining, by the at least one processor and based on the word embeddings:
    named entities corresponding to the text tokens;
    one or more accuracy predictions corresponding to the named entities; and
    a document accuracy prediction based on the one or more accuracy predictions corresponding to the named entities, wherein different weights are assigned to the named entities to determine the document accuracy prediction;
  comparing, by the at least one processor, the one or more accuracy predictions or the document accuracy prediction with at least one threshold;
  associating, by the at least one processor and based on the comparing, the named entities with one or more confidence levels; and
  delivering, by the at least one processor, the named entities and the one or more confidence levels.

2. The method of claim 1, wherein the document is a financial document.

3. The method of claim 1, wherein a word embedding is a vector of real numbers.

4. The method of claim 1, wherein the one or more accuracy predictions further include:
  a token-level accuracy prediction for a first text token of the text tokens.

5. The method of claim 1, wherein the pre-trained language model is a bidirectional transformer encoder model comprising a plurality of encoder layers.

6. The method of claim 5, wherein an output of a first encoder layer, of the plurality of encoder layers, is an input to a second encoder layer of the plurality of encoder layers.

7. The method of claim 5, wherein an encoder layer comprises a self-attention sublayer and a feedforward neural network sublayer.

8. The method of claim 7, wherein:
  the encoder layer has a sequence of input values; and
  the self-attention sublayer comprises processing a first input value, of the input values, based at least on a second input value of the input values.

9. The method of claim 1, wherein:
  the determining the named entities is based at least on a first decoder; and
  the determining the one or more accuracy predictions is based at least on a second decoder.

10. The method of claim 9, further comprising fine tuning the pre-trained language model based on at least one first outcome of the first decoder or at least one second outcome of the second decoder.

11. The method of claim 9, further comprising:
  training one or more first parameters of the first decoder based on at least one first outcome of the first decoder and at least one second outcome of the second decoder; and
  training one or more second parameters of the second decoder based on the at least one second outcome of the second decoder and the at least one first outcome of the first decoder.

12. The method of claim 9, wherein a decoder comprises one or more of a self-attention sublayer, an encoder-decoder attention sublayer and a feedforward linear neural network sublayer.

13. The method of claim 1, further comprising:
  concatenating contiguous text tokens, that have the same associated named entity, to form a first sequence of text tokens; and
  extracting information based on the first sequence.

14. The method of claim 1, wherein the obtaining the document is based on an optical character recognition processing of an image of the document.

15. The method of claim 1, wherein the document is a structured document.

16. The method of claim 15, wherein the document comprises a plurality of pre-defined fields, wherein the text tokens are derived from the plurality of pre-defined fields.

17. The method of claim 1, wherein the document is an unstructured document.

18. A system comprising:
  a non-volatile memory;
  at least one processor, coupled to the non-volatile memory, configured to:
    obtain a document comprising text tokens;
    determine, based on a pre-trained language model, word embeddings corresponding to the text tokens;
    determine, based on the word embeddings:
      named entities corresponding to the text tokens;
      one or more accuracy predictions corresponding to the named entities; and
      a document accuracy prediction based on the one or more accuracy predictions corresponding to the named entities, wherein different weights are assigned to the named entities to determine the document accuracy prediction;

compare the one or more accuracy predictions or the document accuracy prediction with at least one threshold;
associate, based on the comparing, the named entities with one or more confidence levels; and
deliver the named entities and the one or more confidence levels.

19. The system of claim 18, wherein the document is a financial document.

20. The system of claim 18, wherein a word embedding is a vector of real numbers.

21. The system of claim 18, wherein the one or more accuracy predictions further include:
a token-level accuracy prediction for a first text token of the text tokens.

22. The system of claim 18, wherein the pre-trained language model is a bidirectional transformer encoder model comprising a plurality of encoder layers.

23. The system of claim 22, wherein an output of a first encoder layer, of the plurality of encoder layers, is an input to a second encoder layer of the plurality of encoder layers.

24. The system of claim 22, wherein an encoder layer comprises a self-attention sublayer and a feedforward neural network sublayer.

25. The system of claim 24, wherein:
the encoder layer has a sequence of input values; and
the self-attention sublayer comprises processing a first input value, of the input values, based at least on a second input value of the input values.

26. The system of claim 18, wherein:
the determining the named entities is based at least on a first decoder; and
the determining the one or more accuracy predictions is based at least on a second decoder.

27. The system of claim 26, wherein the at least one processor is further configured to fine tune the pre-trained language model based on at least one first outcome of the first decoder or at least one second outcome of the second decoder.

28. The system of claim 27, wherein the at least one processor is further configured to:
train one or more first parameters of the first decoder based on at least one first outcome of the first decoder and at least one second outcome of the second decoder; and
train one or more second parameters of the second decoder based on the at least one second outcome of the second decoder and the at least one first outcome of the first decoder.

29. The system of claim 26, wherein a decoder comprises one or more of a self-attention sublayer, an encoder-decoder attention sublayer and a feedforward linear neural network sublayer.

30. The system of claim 18, wherein the at least one processor is further configured to:
concatenate contiguous text tokens, that have the same associated named entity, to form a first sequence of text tokens; and
extract information based on the first sequence.

31. The system of claim 18, wherein the obtaining the document is based on an optical character recognition processing of an image of the document.

32. The system of claim 18, wherein the document is a structured document.

33. The system of claim 32, wherein the document comprises a plurality of pre-defined fields, wherein the text tokens are derived from the plurality of pre-defined fields.

34. The system of claim 18, wherein the document is an unstructured document.

* * * * *